United States Patent

Chui et al.

Patent Number: 6,009,434
Date of Patent: Dec. 28, 1999

[54] SYSTEM AND METHOD FOR TREE ORDERED CODING OF SPARSE DATA SETS

[75] Inventors: Charles K. Chui, Palo Alto; Rongxiang Yi, Sunnyvale, both of Calif.

[73] Assignee: Teralogic, Inc., Menlo Park, Calif.

[21] Appl. No.: 09/183,662

[22] Filed: Oct. 29, 1998

Related U.S. Application Data

[63] Continuation of application No. 08/758,589, Nov. 27, 1996, Pat. No. 5,893,100.

[51] Int. Cl.⁶ .................................................. G06F 17/30
[52] U.S. Cl. ....................... 707/100; 707/101; 707/102; 707/103; 707/104
[58] Field of Search .................................. 707/100, 101, 707/102, 103, 104

[56] References Cited

U.S. PATENT DOCUMENTS

| | | | |
|---|---|---|---|
| 3,584,183 | 6/1971 | Chiaretta et al. | 219/121 |
| 3,685,016 | 8/1972 | Eachus | 371/37.4 |
| 3,691,557 | 9/1972 | Constant | 342/25 |
| 4,599,567 | 7/1986 | Goupillaud et al. | 326/77 |
| 4,974,187 | 11/1990 | Lawton | 364/768.01 |
| 5,014,134 | 5/1991 | Lawton et al. | 358/236.3 |
| 5,254,919 | 10/1993 | Bridges et al. | 318/560 |
| 5,262,958 | 11/1993 | Chui et al. | 364/487 |
| 5,271,012 | 12/1993 | BLaum et al. | 395/182.04 |
| 5,283,878 | 2/1994 | Murray | 707/100 |
| 5,321,776 | 6/1994 | Shapiro | 382/56 |
| 5,347,479 | 9/1994 | Miyazaki | 364/725 |
| 5,384,725 | 1/1995 | Coifman et al. | 364/807 |
| 5,388,182 | 2/1995 | Benedetto et al. | 395/2.14 |
| 5,392,255 | 2/1995 | LeBrass et al. | 367/50 |
| 5,414,741 | 5/1995 | Shapiro | 382/232 |
| 5,420,891 | 5/1995 | Akansu | 375/350 |
| 5,579,475 | 11/1996 | Blaum et al. | 395/182.05 |
| 5,893,100 | 4/1999 | Chui et al. | 707/100 |

OTHER PUBLICATIONS

Potter et al, Array Processor, Supercomputers, IEEE, pp. 1896–1914, Dec. 1989.

Maier et al, Object Databases for Scientific Computing, IEEE, pp. 176–184, Sep. 1994.

Lu et al, An Encoding Procedure and a Decoding Procedure for a New Modified Huffman Code, IEEE, pp. 128–136, Jan. 1990.

Primary Examiner—Thomas G. Black
Assistant Examiner—Frantz Coby
Attorney, Agent, or Firm—Pennie & Edmonds LLP

[57] ABSTRACT

A data encoder and method utilizes a node list for storing a list of nodes in the data array to be processed, a branch list for storing a list of tree branches in the data array to be processed and a set list for storing a list of data sets. The method begins by initially storing in the node list node identifiers representing a predefined set of nodes in the data array, corresponding to coefficients generated by a last iteration of a data decomposition procedure. Also, it initially stores in the branch list branch identifiers representing tree branches corresponding to a predefined subset of the nodes initially listed in the node list. Each such tree branch has an associated root node and a branch depth value indicating how many node layers intervene between the root node and the nodes of the tree branch closest to the root node. The set list is initially empty, and a parameter called the LayerLimit value is also initialized. For successively smaller values of m, where m is a positive integer, a set of data encoding steps are repeatedly performed so as to process all nodes, branches and sets in the lists. A magnitude flag is output for each node, branch and set to indicate whether or not it is or contains a node whose absolute value is equal to or larger than $2^{m-1}$, and for each node, branch and set that is equal to or larger than $2^{m-1}$ further processing is performed.

13 Claims, 13 Drawing Sheets

SYSTEM AND METHOD FOR TREE ORDERED CODING OF SPARSE DATA SETS

This application is continuation of U.S. patent application Ser. No. 08/758,589, filed Nov. 27, 1996, now U.S. Pat. No. 5,893,100.

The present invention relates generally to systems and methods for lossless compression and reconstruction of data, such as the quantized wavelet coefficients of a wavelet transformed image, that is sparsely populated by non-zero data, and particularly to a system and method for efficiently identifying and encoding portions of a data set occupied by zero and near-zero values.

BACKGROUND OF THE INVENTION

Sparsely populated data sets are utilized in numerous technical fields. The present invention was developed for efficiently encoding image data that has been transformed by successive applications of wavelet transforms, but is equally applicable to other types of sparsely populated data sets. Image data that has been transformed by successive applications of wavelet transforms tends to have large portions occupied by zero and near-zero values, especially if the data is subjected to a data quantization step prior to encoding.

The primary goals of the present invention are to provide an encoding methodology that (A) efficiently locates data tree branches that are entirely occupied by zero data and encoding such branches with as few data bits as possible, (B) determines the maximum number of data bits required to encode data tree branches that include at least some non-zero data, and (C) encodes non-zero data with the minimum number of data bits required to losslessly store such data.

Another goal of the present invention is to provide an encoding methodology that is computationally very efficient.

SUMMARY OF THE INVENTION

In summary, the present invention is a system and method for encoding an array of data. The data encoding method utilizes three list data structures, including a node list data structure for storing a list of nodes in the data array to be processed, a branch list data structure for storing a list of tree branches in the data array to be processed and a set list data structure for storing a list of data sets. The method begins by initially storing in the node list data structure node identifiers representing a predefined set of nodes in the data array, corresponding to coefficients generated by a last iteration of a data decomposition procedure. Also, it initially stores in the branch list data structure branch identifiers representing tree branches corresponding to a predefined subset of the nodes initially listed in the node list data structure. Each such tree branch has an associated root node and a branch depth value indicating how many node layers intervene between the root node and the nodes of the tree branch closest to the root node. The set list data structure is initially empty, and a parameter called the LayerLimit value is also initialized.

For successively smaller values of m, where m is a positive integer, a set of data encoding steps are repeatedly performed so as to process all nodes, branches and sets in the lists. A magnitude flag is output for each node, branch and set to indicate whether or not it is or contains a node whose absolute value is equal to or larger than $2^{m-1}$, and for each node, branch and set that is equal to or larger than $2^{m-1}$ further processing is performed. This additional processing includes, encoding each such node, splitting each such branch either into smaller branches or into a set and one smaller branch, and splitting each set into smaller sets unless the set is equal to or smaller than a predefined minimum size, in which case the nodes of the set of encoded.

The data decoding method retraces the encoded data so as to reverse the process performed by the encoding method. The bits of the encoded data are read, in order, in a single pass from the first bit to the last. When the last data bit in the encoded data has been processed, reconstruction of the encoded data array is complete. As the encoded data is read, entries are added to the node, branch and set lists in accordance with the data values read, and as data representing fully encoded nodes are read those values our decoded and output to a reconstructed data array.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
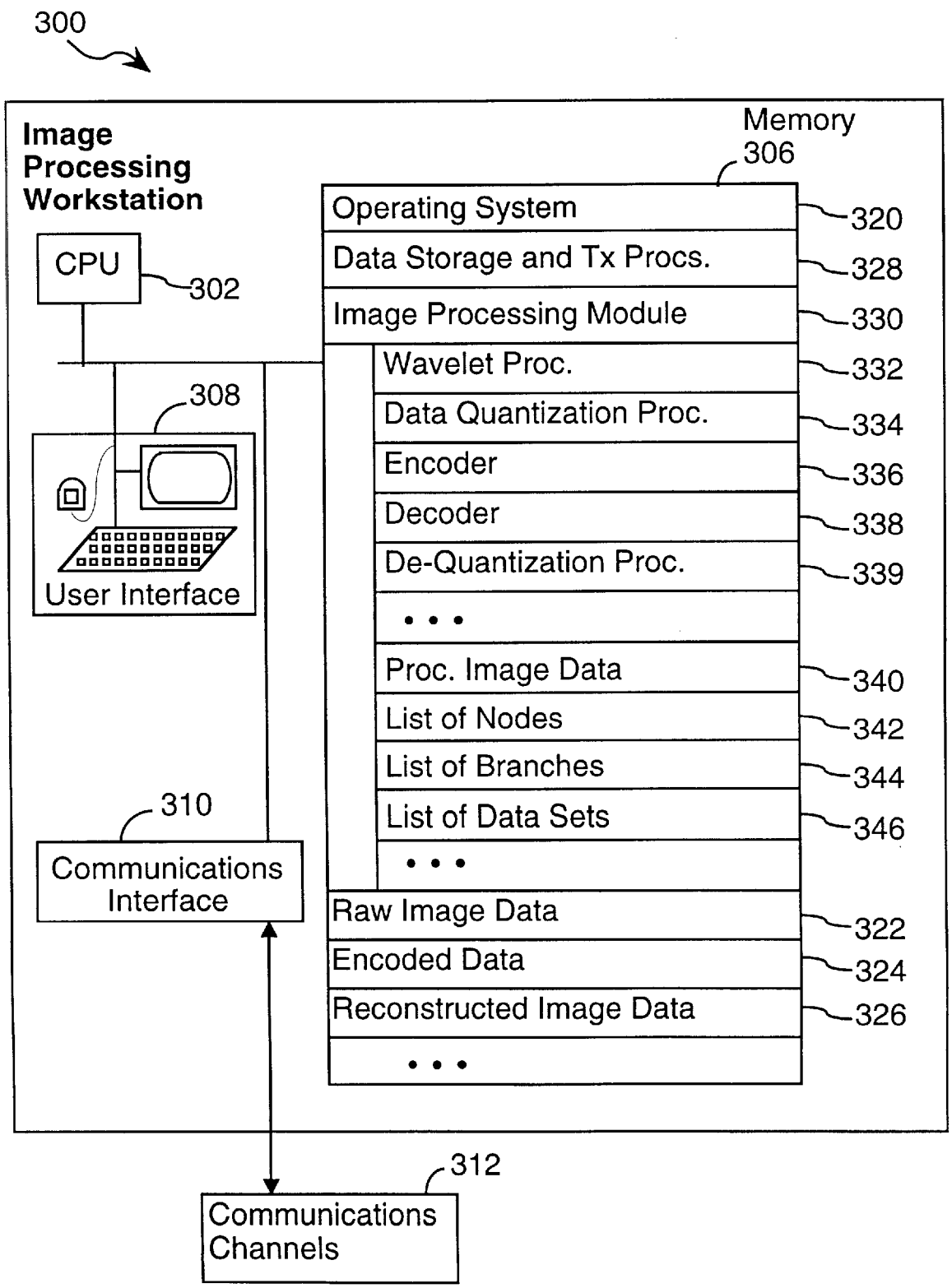
FIG. 1 is a block diagram of an image processing workstation incorporating a first preferred embodiment of the present invention.

Referring to FIG. 1, there is shown a computer system or workstation 300 that incorporates a first preferred embodiment of the present invention. The system 300 includes a central processing unit 302, internal system, control and data busses 304, memory 306 (including random access memory as well as non-volatile memory such as magnetic disk storage), a user interface 308, and a communications interface 310 for transferring information to and from other devices via one or more communication channels 312.

Memory 306 stores both computer software and data, including:

an operating system 320 raw image data 322, such as image data files generated by a digital camera, CAT scan device, MR imaging system, or an image scanner;

encoded data 324, such as compressed image data files generated by a data encoder or data encoding procedure;

reconstructed image data 326, such as reconstructed image data files generated by a data decoder and wavelet data reconstruction procedure; and procedures 328 for managing the storage, transmission and receipt of data files;

an image processing module 330 for processing image data.

In a preferred embodiment, the image processing module 330 includes:
- a wavelet procedure 332 for transforming arrays of data using wavelet transforms into wavelet analyzed data, and vice versa;
- a data quantization procedure 334 for quantizing the wavelet analyzed data (also known as wavelet coefficients) produced by the wavelet procedure 332;
- an encoder procedure 336 for encoding an array of data;
- a decoder procedure 338 for decoding a set of encoded data into a corresponding data array;
- a data de-quantization procedure 339 for remapping quantized wavelet coefficients back into wavelet coefficients;
- processed image data files or storage arrays 340 for temporarily storing wavelet analyzed data or decoded data; and
- a block list data structure 342 for storing data utilized by the encoder and decoder procedures 336, 338.

As indicated above, the present invention is suitable for use with any sparsely populated data set. For the purposes of explaining the operation of the encoder and decoder procedures, the specific type of wavelet transform procedure 332 used and the specific type of data quantization procedure 334 used to transform an image file into a processed image data file are not relevant and therefore are not further described herein. However, a preferred embodiment of the wavelet transform procedure 332 and the data quantization procedure 334 are described in U.S. patent application Ser. No. 08/758,224, filed Nov. 27, 1996 now U.S. Pat. No. 5,909,518, "System and Method for Performing Wavelet and Inverse Wavelet Like Transformations of Digital Data Using Only Add and Bit Shift Arithmetic Operations," which is hereby incorporated by reference as background information.

It is also noted that the wavelet transformation procedures may, in an alternate embodiment, be performed in part or in whole by a dedicated wavelet transformation circuit.

Figure 2:
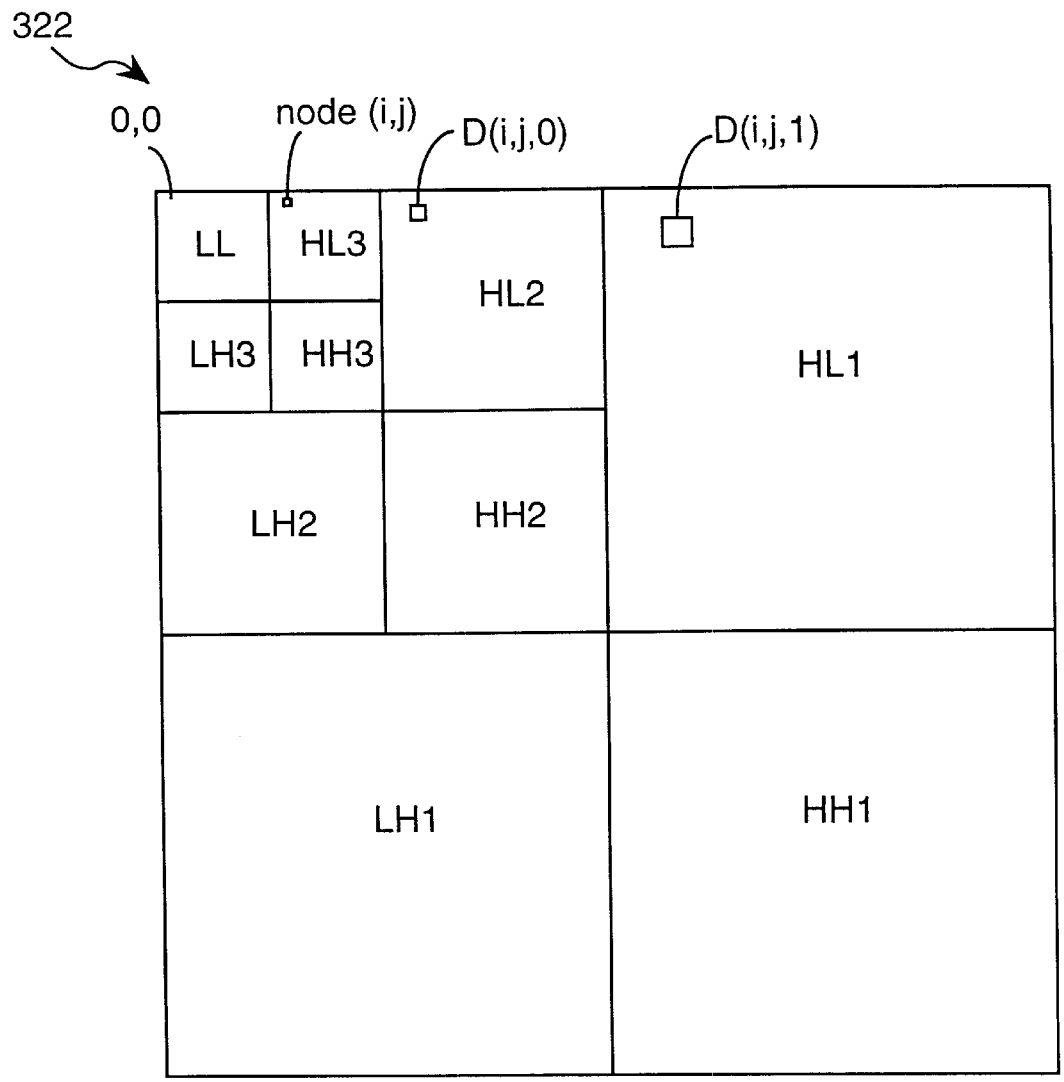
FIG. 2 schematically represents an image data array and an overlapping set of data analysis arrays.

Referring to FIG. 2, there is shown a two dimensional array of coefficients generated by successive applications of a wavelet decomposition transform. A first application of the wavelet decomposition transform to an initial two dimensional array of data generates four sets of coefficients, labeled LL, HL1, LH1 and HH1. Each succeeding application of the wavelet decomposition transform is applied only to the LL set of coefficients generated by the previous wavelet transformation step and generates four new sets of coefficients, labeled LL, HLx, LHx and HHx, where x represents the wavelet transform "layer" or iteration. After the last wavelet decomposition transform iteration only one LL set remains. The total number of coefficients generated is equal to the number of data samples in the original data array. The different sets of coefficients generated by each transform iteration are sometimes called layers.

Figure 3A:
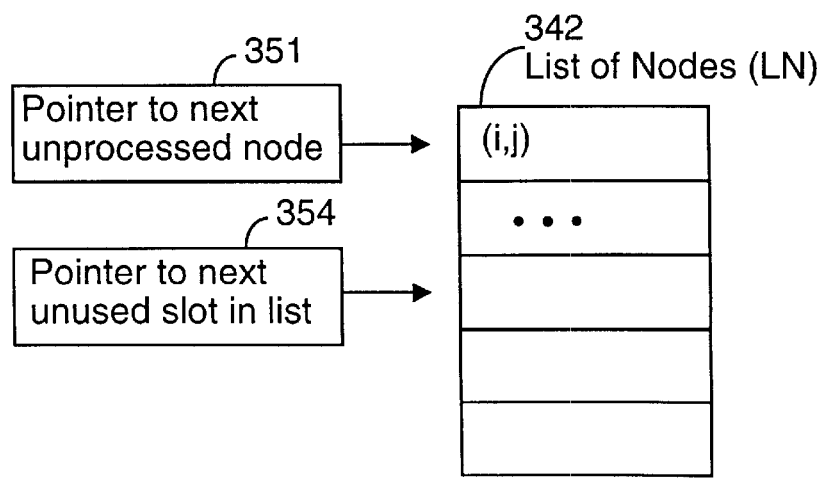
FIGS. 3A, 3B and 3C depict a list data structure used by both the data encoder and data decoder of the preferred embodiment to keep track of nodes, branches and data sets to be processed.
Figure 3B:
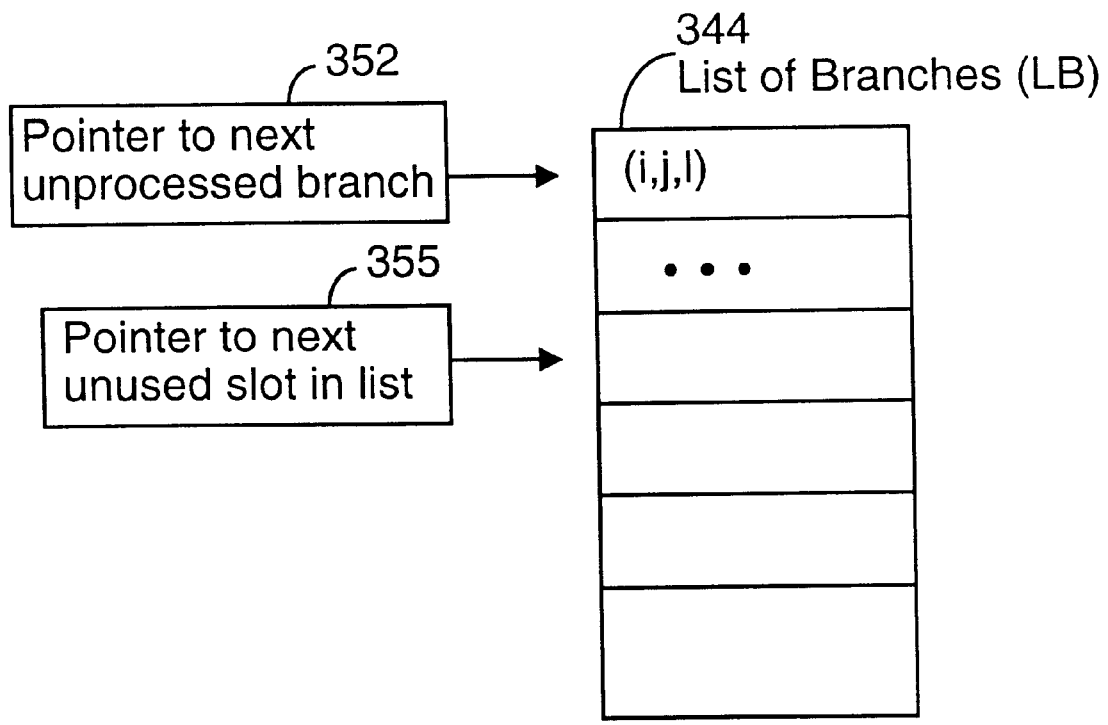
Figure 3C:
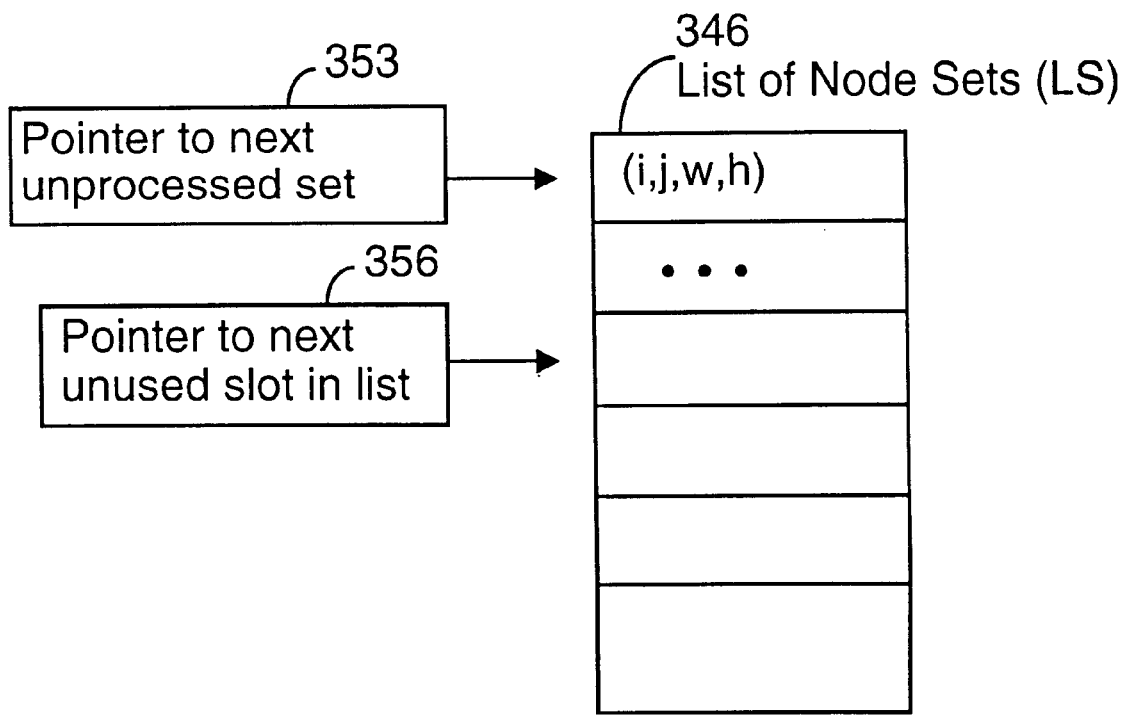

Referring to FIGS. 3A, 3B and 3C, the main "bookkeeping" data structures used by the encoder and decoder procedures are shown. In particular, three list data structures 342, 344 and 346 are used to keep track of nodes, branches and sets of data that have not yet been analyzed. For each list 342, 344, 346 there is a first pointer 351, 352, 353 that points to the oldest list entry that has not yet been processed, and a second pointer 354, 355, 356 that points to the next unused slot in the list.

Figure 4:
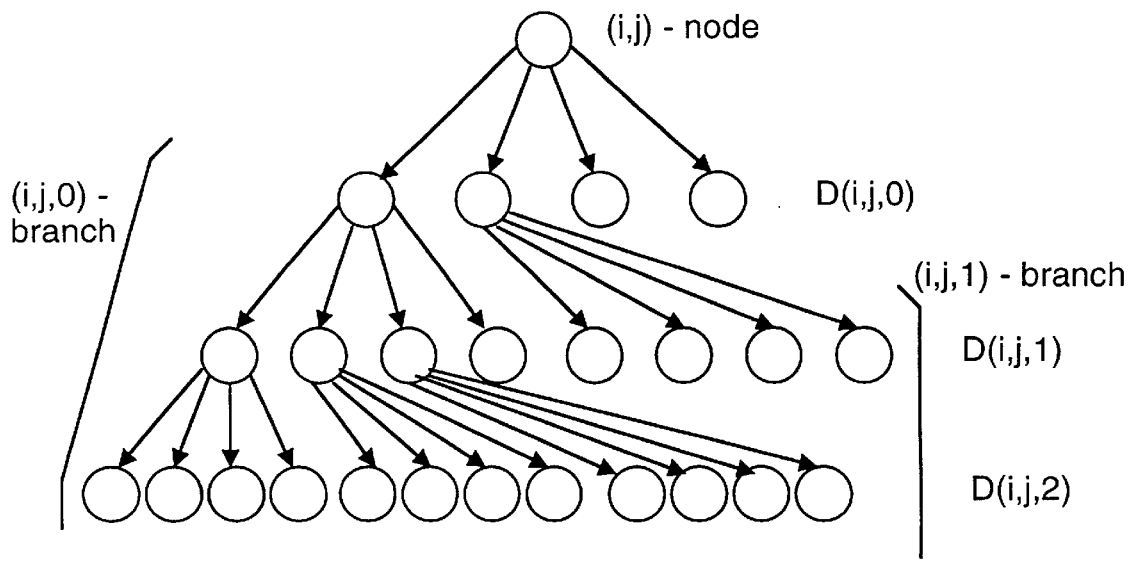
FIG. 4 depicts the node, branch and descendants structures imposed by the present invention on a set of data to be encoded.

Referring to FIGS. 2 and 4, successive applications of a wavelet decomposition transform tends to generate coefficients that have a tree-like data patterns in them. In particular, excluding the LL array of coefficients produced by the last of the successive applications of the wavelet decomposition transform, the node (i,j) in any of the other arrays of coefficients produced by the Nth decomposition step is said to have 4 children (denoted as D(i,j,0) in FIGS. 2 and 4) in the corresponding array of coefficients produced by the N-1 decomposition step, 16 grandchildren (denoted as D(i,j,1) in FIGS. 2 and 4) in the corresponding array of coefficients produced by the N-2 decomposition step, 64 grandchildren (not shown in FIGS. 2 and 4) in the corresponding array of coefficients produced by the N-3 decomposition step, and so on.

Encoder Procedure

Figure 5:
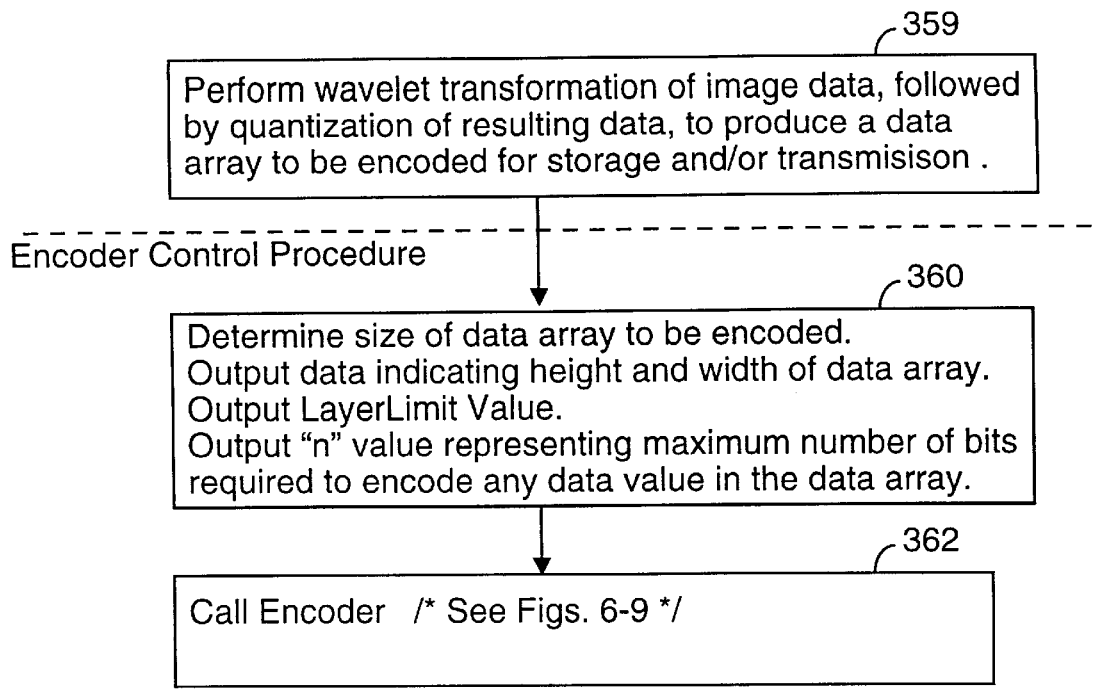
FIGS. 5, 6, 7, 8 and 9 are flow charts of a preferred embodiment of the data encoding method of the present invention.

Referring to FIG. 5, prior to execution of the encoder procedure 336 (steps 360, 362), one or more data preparation procedures will typically be performed (step 359). In the preferred embodiments, data preparation consists of successively performing a wavelet decomposition transformation (using wavelet procedure 332) on a set of data such as an image data array, followed by quantization (using data quantization procedure 334) of the resulting data to a predefined set of discrete data values. The wavelet transformation and quantization data preparation steps typically generate a data array sparsely populated with non-zero data. However, the encoder procedure is suitable for encoding virtually any data array, including three-dimensional and N-dimensional data arrays.

Referring to FIGS. 5–9, the encoder procedure 336 works, in general, by analyzing each of the data trees having a root node in the HL, LH and HH sets of coefficients generated by a last application of a wavelet decomposition transform. In the preferred embodiment of the present invention, all the trees and subtrees in the data to be encoded are traversed in a predefined order, and data indicating the maximum number of bits required to encode the maximum data value in each data tree or subtree is written into the output data in the same order that the data trees and their subtrees are analyzed, thereby enabling a decoder procedure to determine the number of data bits used to encode each data value stored in the output data. The order in which the trees and subtrees are traversed is dependent, in part, on the maximum data values in each of the trees and subtrees. The encoding procedures writes into the output data bit values that indicate not only the maximum values in the various trees and subtrees, but also the order in which those trees and subtrees should be processed by a corresponding decoder procedure.

Prior to execution of the encoding procedure, or alternately at the beginning of the encoding procedure, a variable called LayerLimit will be assigned a value. This value may be a default value, or a value set by the user or a value selected automatically in accordance with some predefined characteristic of the data being encoded. For instance, if LayerLimit is set to a value of 1, then node descendants with a branch that are more than 2 (i.e., LayerLimit+1) node levels away from the root of any branch are divided into smaller branches (whose root nodes are the children of the root of the branch being processed) before those descendants are encoded and written to the output file. Node descendants within a branch that are less than LayerLimit+2 node levels away from the root of the branch are encoded without first dividing the branch into smaller branches.

Referring to FIG. 5, the encoder procedure begins by determining the height and width of the specified data array to be encoded and outputting those values to the compressed data file (step 360). Also output to the compressed data file are the LayerLimit value and the "n" value representing the maximum number of bits that will be required to encode any data value in the data array to be encoded. Then the main encoder procedure is called (step 362).

Table 1 provides definitions of terms and abbreviations used in the flow chart figures.

TABLE 1

| | Definitions of Terms used in Flow Chart Figures |
|---|---|
| (i,j) node | a single particular position in a data array |
| LN | List of nodes to be processed |
| LB | List of branches to be processed |
| LS | List of sets of nodes (generally rectangular or square arrays of data samples) to be processed |
| D(i,j,l) | Descendants of the (i,j) node that are l + 1 node layers below the (i,j) node |
| (i,j,l) branch | a branch or subtree of nodes that include all descendants of the (i,j) node that are at least l + 1 layers below the (i,j) node |
| (i,j,w,h) | a set or subarray of nodes with an origin at the (i,j) node and having a width of w and a height of h. |
| V(i,j) | Value of the (i,j) node |
| V(i,j,l) | Maximum absolute value of all nodes in the (i,j,l) branch |
| V(i,j,w,h) | Maximum absolute value of all nodes in the (i,j,w,h) set |
| abs(v) | the absolute value of v |
| sgn(v) | the sign of v |
| Bit(h,w,k) | the maximum number of bits required to encode the absolute value of any data value in the block (i.e., int($\log_2 V$) + 1, where "int()" represents the integer portion of a specified value) |
| n | number of bits of the largest $|V(i,j)|$ in the entire specified set of data to be encoded |
| LayerLimit | Maximum number of layers to be processed within any branch |

Figure 6:
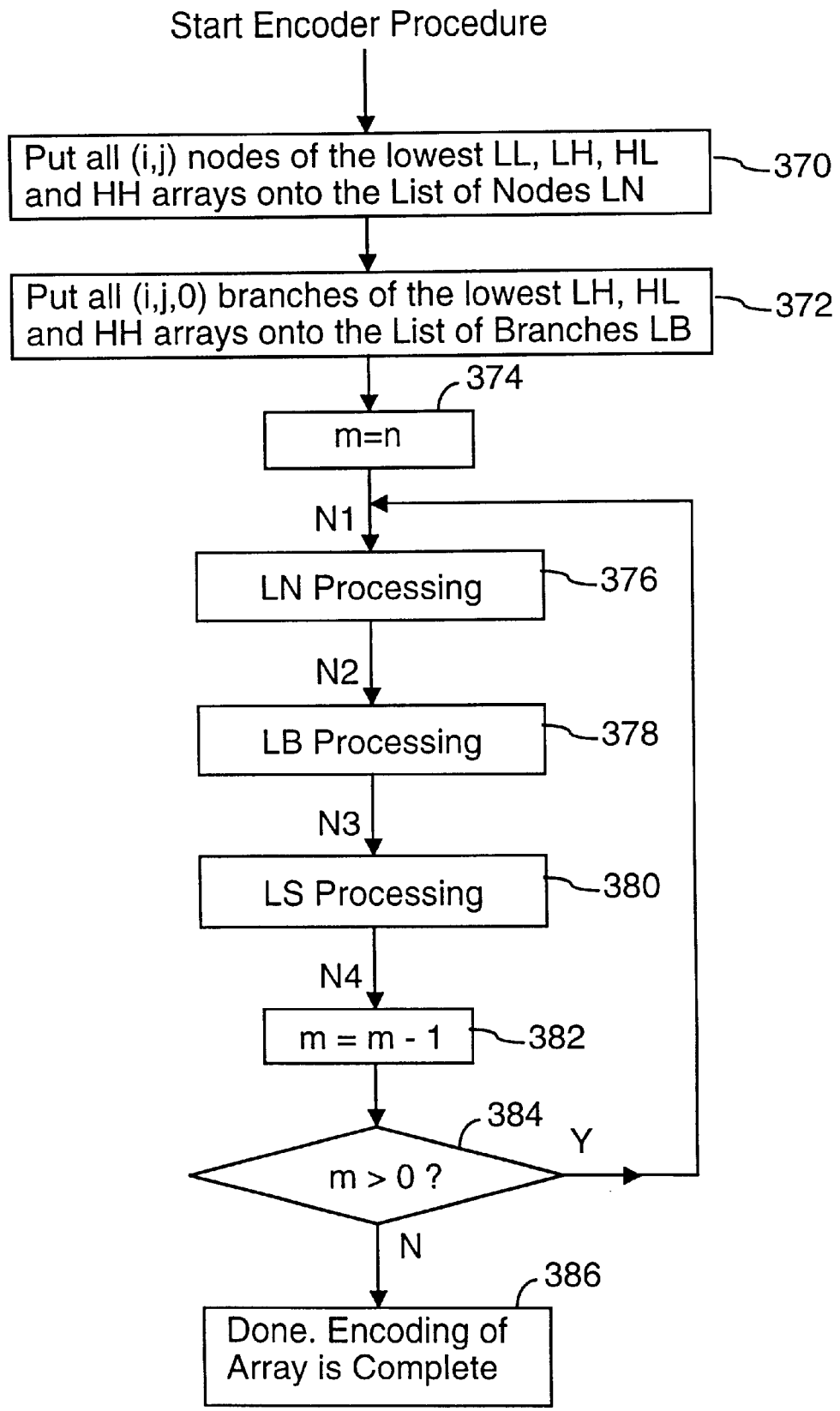

Referring to FIG. 6, the procedure for encoding a specified array of data values begins by putting all (i,j) nodes of the lowest (i.e., smallest) LL, LH, HL and HH arrays onto the List of Nodes 342 (step 370), and putting all (i,j,0) branches of the lowest LH, HL and HH arrays onto the list of branches (step 372). A control variable m is then set to n, where n is equal to the number of bits of the data sample with the largest absolute value in the entire specified set of data to be encoded (step 374).

Next, using the current value of m, the LN processing procedure (step 376), LB processing procedure (step 378) and LS processing procedure (step 380) are called. These three procedures process and encode nodes, branches and data sets with respect to whether or not data samples in those nodes, branches and data sets have an absolute value greater than $2^{m-1}$. After executing these three procedures, the control variable m is decremented by 1 (step 382), and if m is still greater than zero (step 384), the three procedures are executed again. This continues until m is decremented to a value of zero, at which point the encoding of the data array is complete (step 386).

Figure 7:
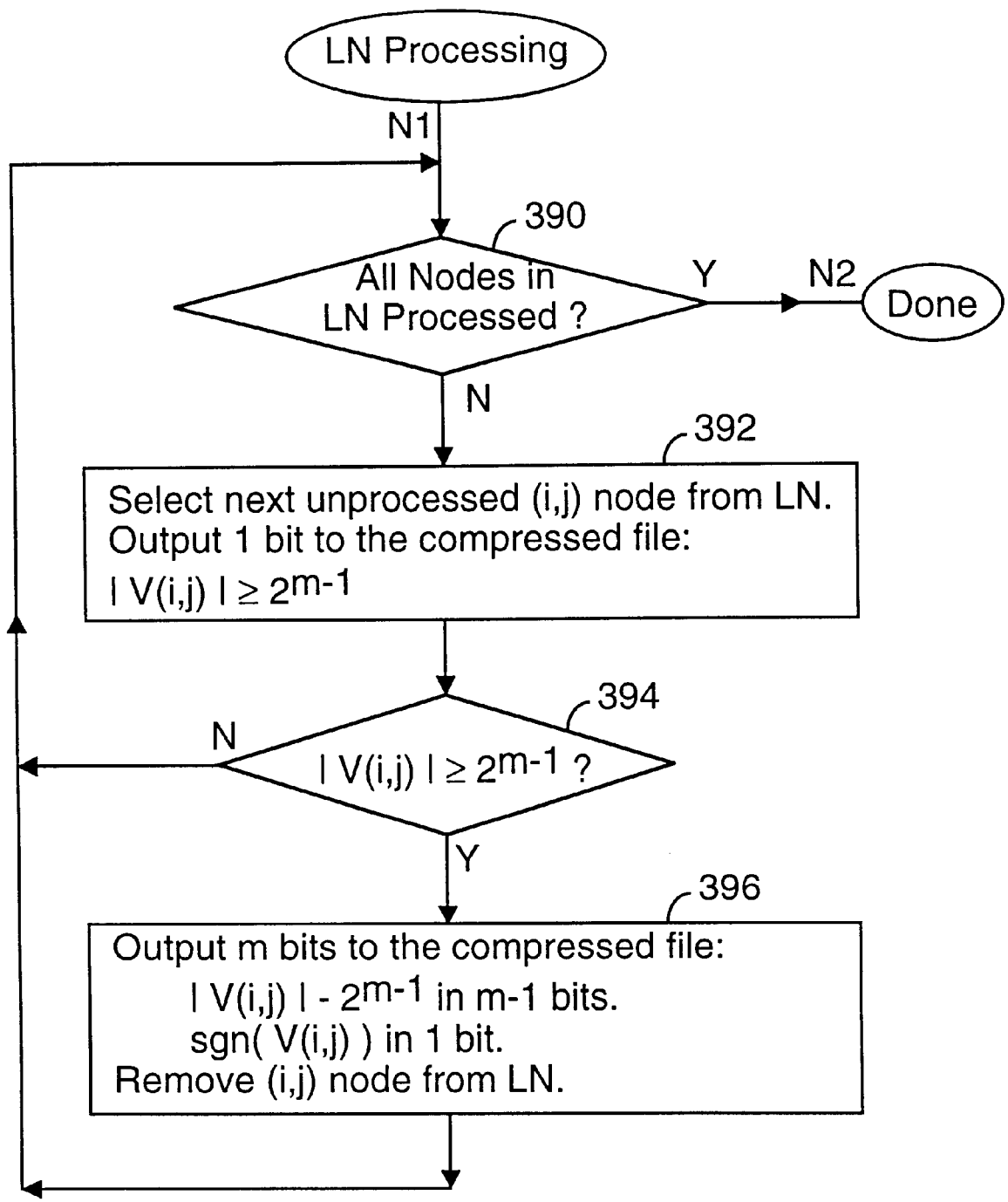

Referring to FIG. 7, the LN processing procedure begins by determining if there are any unprocessed nodes in the list of nodes (step 390). Each time the LN processing procedure is called, the pointer 351 to the next unprocessed node is reset to the very first item in the list. Therefore, unless the list is empty, step 390 will detect the presence of unprocessed nodes in the list when the LN processing procedure is first called. At step 392 the next unprocessed node in the list of nodes is selected and one bit is output to indicate whether or not $|V(i,j)| \geq 2^{m-1}$. If $|V(i,j)| \geq 2^{m-1}$, a 1 bit is output and otherwise a 0 bit is output.

If the absolute value $|V(i,j)|$ of the selected node (i,j) is less than $2^{m-1}$ (i.e., if the bit value output in step 392 is 0, or equivalently if the mth least significant bit of $|V(i,j)|$ is not equal to 1) (step 394), then processing of the selected node is complete for the current iteration of the encoder procedure's processing loop. Otherwise, if the bit value output in step 392 for the current selected node is 1, the procedure outputs m bits, including m−1 that are set equal to $|V(i,j)|-2^{m-1}$ and 1 bit equal to sgn(V(i,j)), and furthermore the current selected node is removed from the list of nodes (step 396).

The LN processing procedure of FIG. 7 continues until all the nodes in the list of nodes have been processed. When the procedure is completed, the nodes previously in the list whose absolute value was greater than or equal to $2^{m-1}$ have been encoded and removed from the list of nodes, while for each of the other nodes in the list a "0" bit has been output to indicate that each of those nodes have an absolute value less than $2^{m-1}$.

Figure 8:
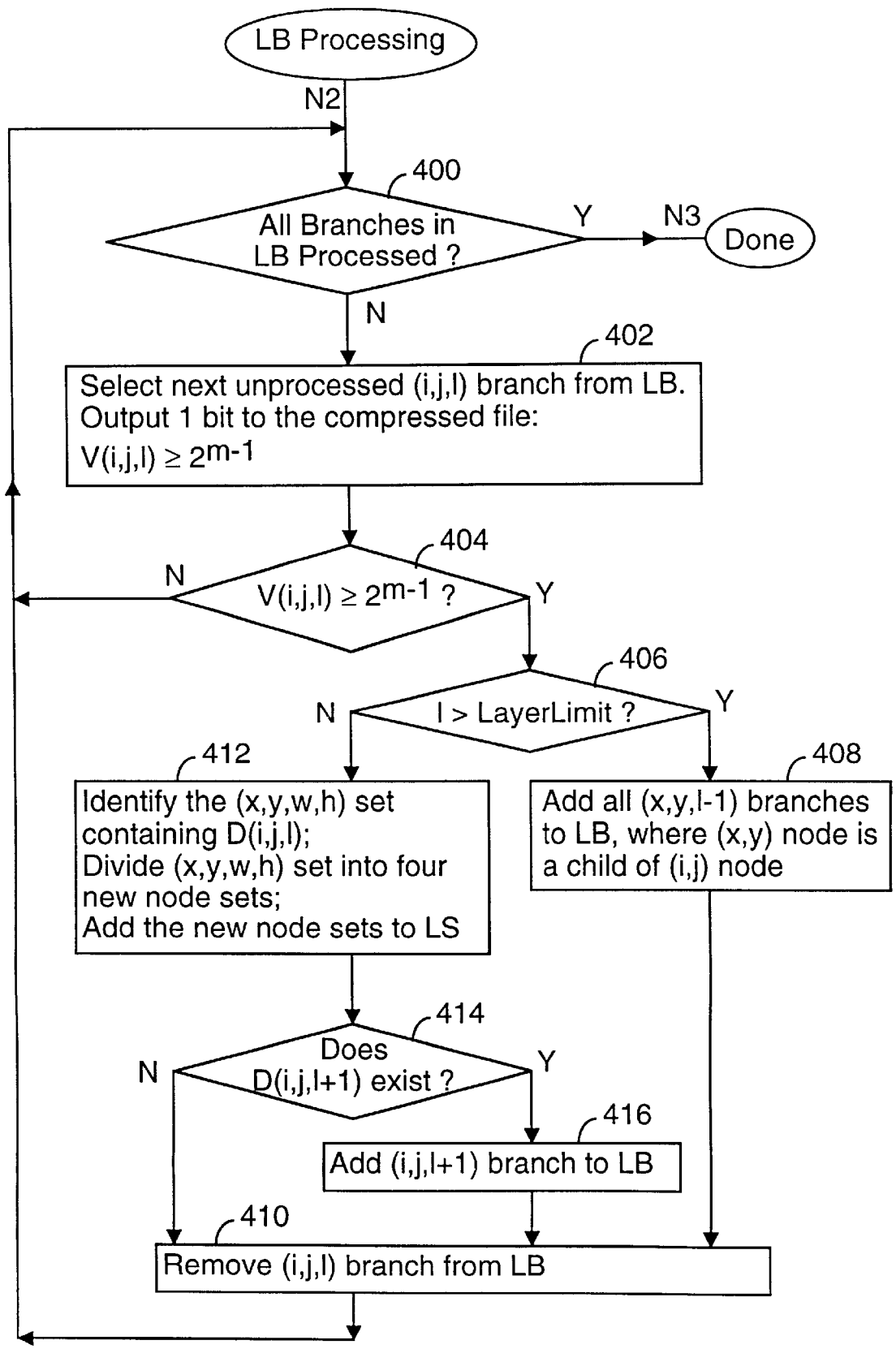

Referring to FIG. 8, the LB processing procedure begins by determining if there are any unprocessed branches in the list of branches (step 400). Each time the LB processing procedure is called, the pointer 352 to the next unprocessed branch is reset to the very first item in the list. Therefore, unless the list is empty, step 400 will detect the presence of unprocessed branches in the list when the LB processing procedure is first called. At step 402 the next unprocessed branch in the list of ranches is selected and one bit is output to indicate whether or not $V(i,j,l) \geq 2^{m-1}$. Thus, if there is at least one node in the (i,j,l) branch whose absolute value is greater than or equal to $2^{m-1}$, a 1 bit is output and otherwise a 0 bit is output.

If the maximum absolute value of the nodes in the selected branch V(i,j,l) is less than $2^{m-1}$ (i.e., if the bit value output in step 402 is 0)(step 404), then processing of the selected branch is complete for the current iteration of the encoder procedure's processing loop. Otherwise, if the bit value output in step 402 for the current selected branch is 1, the selected branch is processed further. In particular, if the branch level l of the selected branch is greater than the LayerLimit, then the selected branch is divided into smaller branches (x,y,l−1), for all (x,y) nodes that are children of the (i,j) node, and those smaller branches are added to the list of branches (step 408). In addition, the selected branch (i,j,l) is removed from the list of branches (step 410). For a two dimensional array of data, four smaller branches will be generated for each branch whose branch depth is greater than the LayerLimit.

If the branch level l of the selected branch is less than or equal to the LayerLimit (step 406), then the procedure identifies the (x,y,w,h) set of nodes containing the node descendants D(i,j,l) at the top level of the selected branch. This set of nodes is divided into new node sets (e.g., four new node sets for a two dimensional data array), which are added to the list of sets (step 412). Next, if the data being encoded includes a lower set of descendants D(i,j,l−1) within the selected branch (step 414), a new (i,j,l+1) branch is added to the list of branches (416). In either case, the selected branch (i,j,l) is removed from the list of branches (step 410). It should be noted that the "new" (i,j,l+1) branch added by step 416 is really just the remaining portion (if any) of the branch (i,j,l) being processed after its topmost layer has been removed. Thus, the collective result of steps 412 and 416 is to remove the topmost layer of nodes from a branch and to place the removed nodes as four sets of nodes on the list of sets.

The LB processing procedure of FIG. 8 continues until all the branches in the list of branches have been processed.

When the procedure is completed, the branches previously in the list that included at least one node whose absolute value was greater than or equal to $2^{m-1}$ have been divided into either sets of data or smaller branches and removed from the list of branches, while for each of the other branches in the list a "0" bit has been output to indicate that none of the nodes in those branches have an absolute value greater than or equal to $2^{m-1}$.

Figure 9:
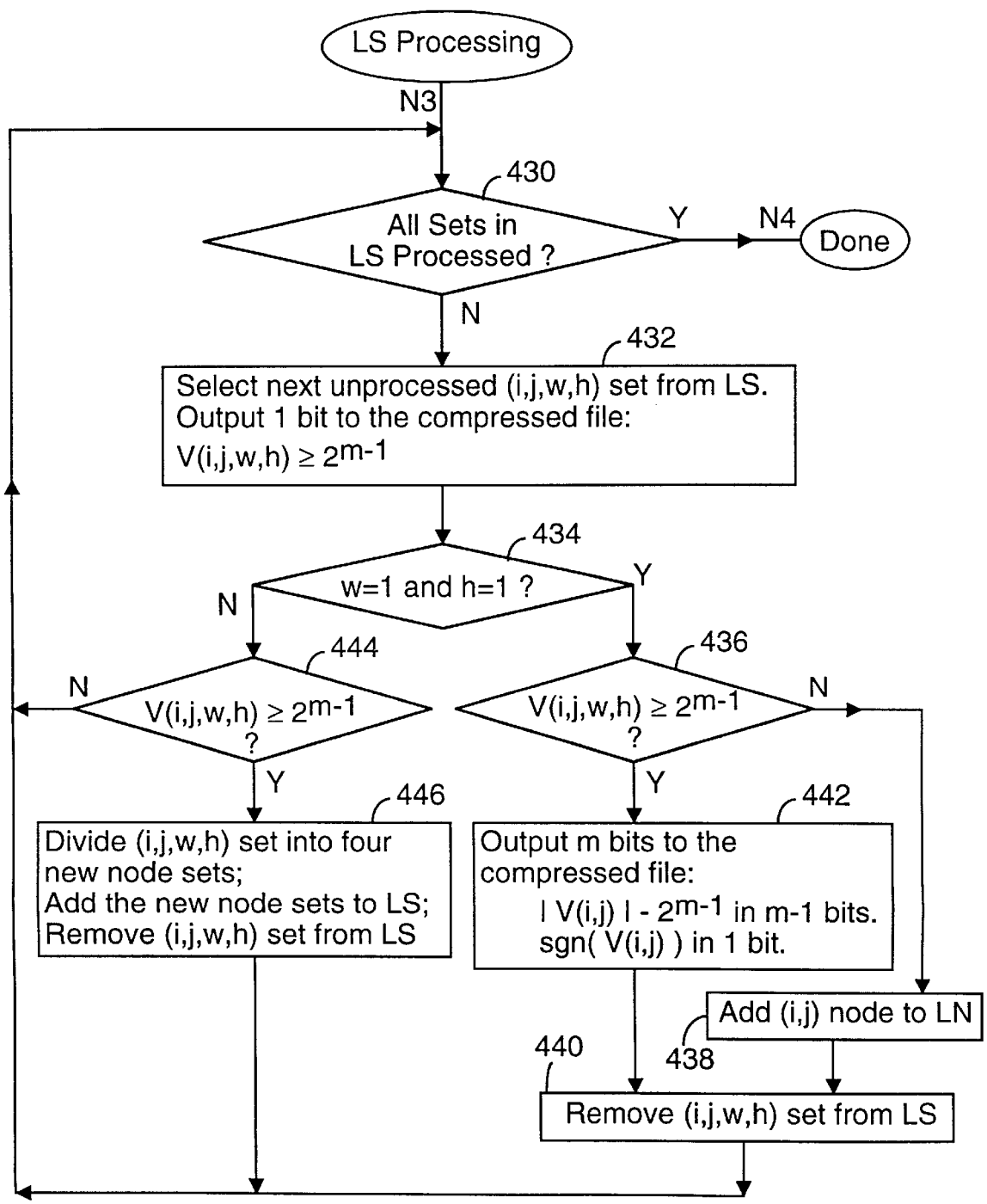

Referring to FIG. 9, the LS processing procedure begins by determining if there are any unprocessed sets in the list of sets (step 430). Each time the LS processing procedure is called, the pointer 353 to the next unprocessed set is reset to the very first item in the list. Therefore, unless the list is empty, step 430 will detect the presence of unprocessed sets in the list when the LS processing procedure is first called. At step 432 the next unprocessed set in the list of sets is selected and one bit is output to indicate whether or not $V(i,j,w,h) \geq 2^{m-1}$. Thus, if there is at least one node in the (i,j,w,h) set of nodes whose absolute value is greater than or equal to $2^{m-1}$, a 1 bit is output and otherwise a 0 bit is output.

If the number of nodes in the selected set is equal to 1 (step 434) and that node's absolute value $|V(i,j)|$ is less than $2^{m-1}$ (i.e., if the bit value output in step 432 is 0) (step 436), then the only node (i,j) in the selected set is added to the list of nodes (step 438) and the selected set is removed from the list of sets (step 440). Otherwise, if the number of nodes in the selected set is equal to 1 (step 434) and the bit value output in step 402 is 1 (step 436), then the procedure outputs m bits, including m−1 bits that are set equal to $|V(i,j)|-2^{m-1}$ and 1 bit equal to sgn( V(i,j) ) (step 442), and furthermore the current selected set (i,j,w,h) is removed from the list of sets (step 440).

However, if the number of nodes in the selected set is greater than 1 (step 434) and the maximum absolute value $V(i,j,w,h)$ of the nodes in the selected set is less than $2^{m-1}$ (i.e., if the bit value output in step 432 is 0) (step 444), then processing of the selected set is complete for the current iteration of the encoder procedure's processing loop. Alternately, if the number of nodes in the selected set is greater than 1 (step 434) and the bit value output in step 432 is 1 (step 444), then the selected set is divided into smaller sets (e.g., four smaller sets for a two dimensional array) and the smaller sets are added to the list of sets. In addition, the selected set (i,j,w,h) is removed from the list of sets (step 446).

The LS processing procedure of FIG. 9 continues until all the sets in the list of sets have been processed. When the procedure is completed, the sets previously in the list that included at least one node whose absolute value was greater than or equal to $2^{m-1}$ have been either divided into smaller sets of data or encoded. These sets have also been removed from the list of sets, while for each of the other sets in the list a "0" bit has been output to indicate that none of the nodes in those sets have an absolute value greater than or equal to $2^{m-1}$.

DECODER PROCEDURE

Referring to FIGS. 10–13, the decoder procedure 338 works, in general, by reading and interpreting the encoded data so as to reverse the process performed by the encoder procedure 336. The bits of the encoded data are read, in order, in a single pass from the first bit to the last. When the last data bit in the encoded data has been processed, reconstruction of the encoded data array is complete.

As the encoded data is read, entries are added to the lists of nodes, branches and sets to identify the nodes, branches and sets that will be processed later in the procedure, along with data indicating the maximum number of bits needed to encode the data in those nodes, branches and sets. Nodes, branches and sets are analyzed in the order they appear in the encoded data.

Figure 10:
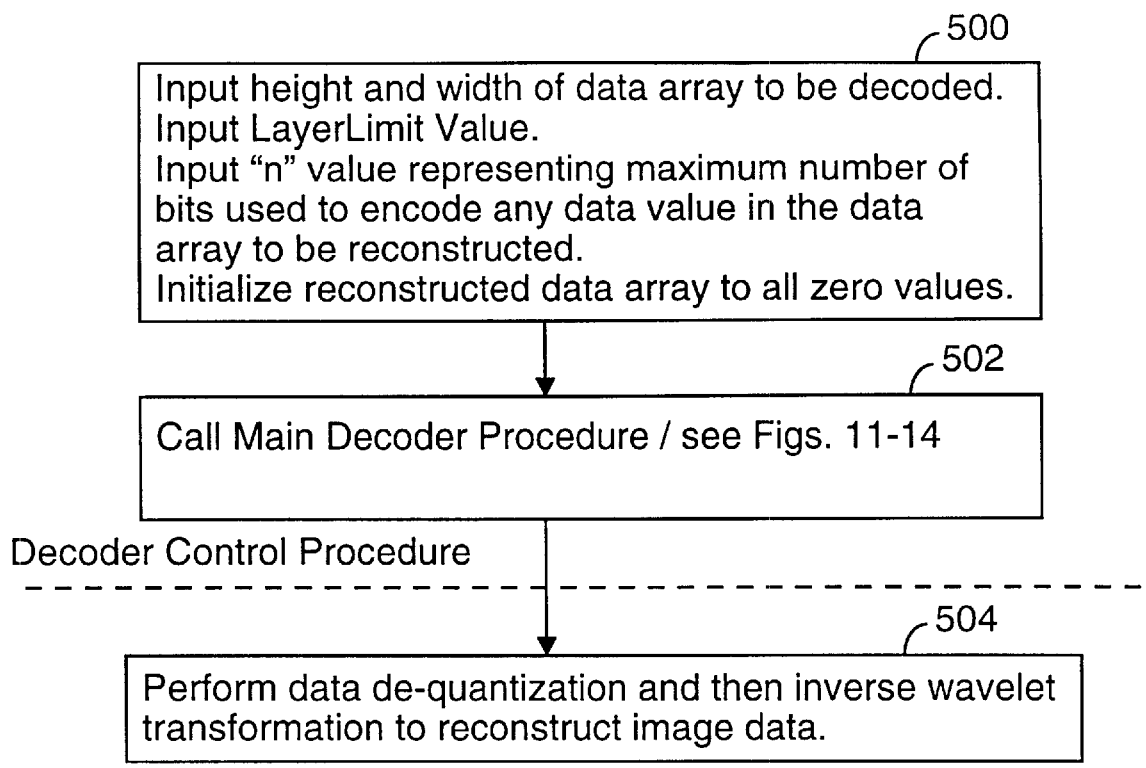
FIGS. 10, 11, 12, 13 and 14 are flow charts of a preferred embodiment of the data decoding method of the present invention.

Referring to FIG. 10, the decoder procedure begins by reading (inputting) from the encoded data the height and width of the data array to be decoded and reconstructed (step 500). The decoder procedure also reads in the LayerLimit value and the "n" value representing the maximum number of bits used to encode any data value in the data array to be reconstructed. Furthermore, the reconstructed data array 326 is initialized to all zero values. Then the main decoder procedure (shown in FIGS. 11–14) is called (step 502). After the decoding process is complete, the resulting reconstructed data may be subjected to one or more post-processing procedures (step 504), such as a dequantization procedure followed by a reverse wavelet transformation procedure so as to reconstruct an image file or other data array.

Figure 11:
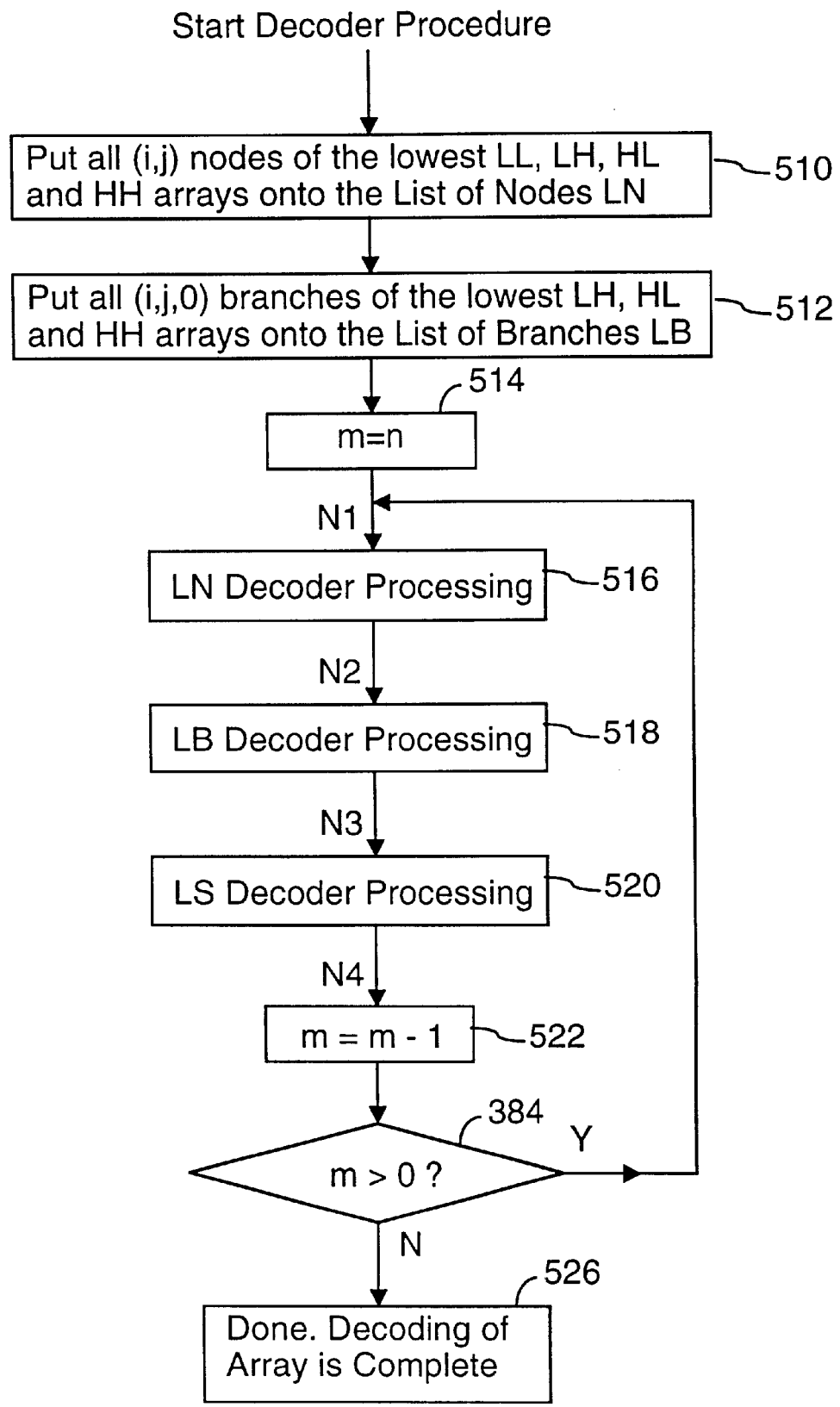

Referring to FIG. 11, the procedure for decoding a specified array of data values begins by putting all (i,j) nodes of the lowest LL, LH, HL and HH arrays (i.e., the four smallest arrays near the top left corner of the encoded, decomposed data as shown in FIG. 2) onto the List of Nodes 342 (step 510), and putting all (i,j,0) branches of the lowest LH, HL and HH arrays onto the list of branches (step 512). A control variable m is then set to n, where n is equal to the number of bits of the data sample with the largest absolute value in the entire specified set of data to be encoded (step 514).

Next, using the current value of m, the LN decoder processing procedure (step 516), LB decoder processing procedure (step 518) and LS decoder processing procedure (step 520) are called. These three procedures process and decode nodes, branches and data sets with respect to whether or not data samples in those nodes, branches and data sets have an absolute value greater than $2^{m-1}$. After executing these three procedures, the control variable m is decremented by 1 (step 522), and if m is still greater than zero (step 524), the three procedures are executed again. This continues until m is decremented to a value of zero, at which point the decoding of the data array is complete (step 526).

Figure 12:
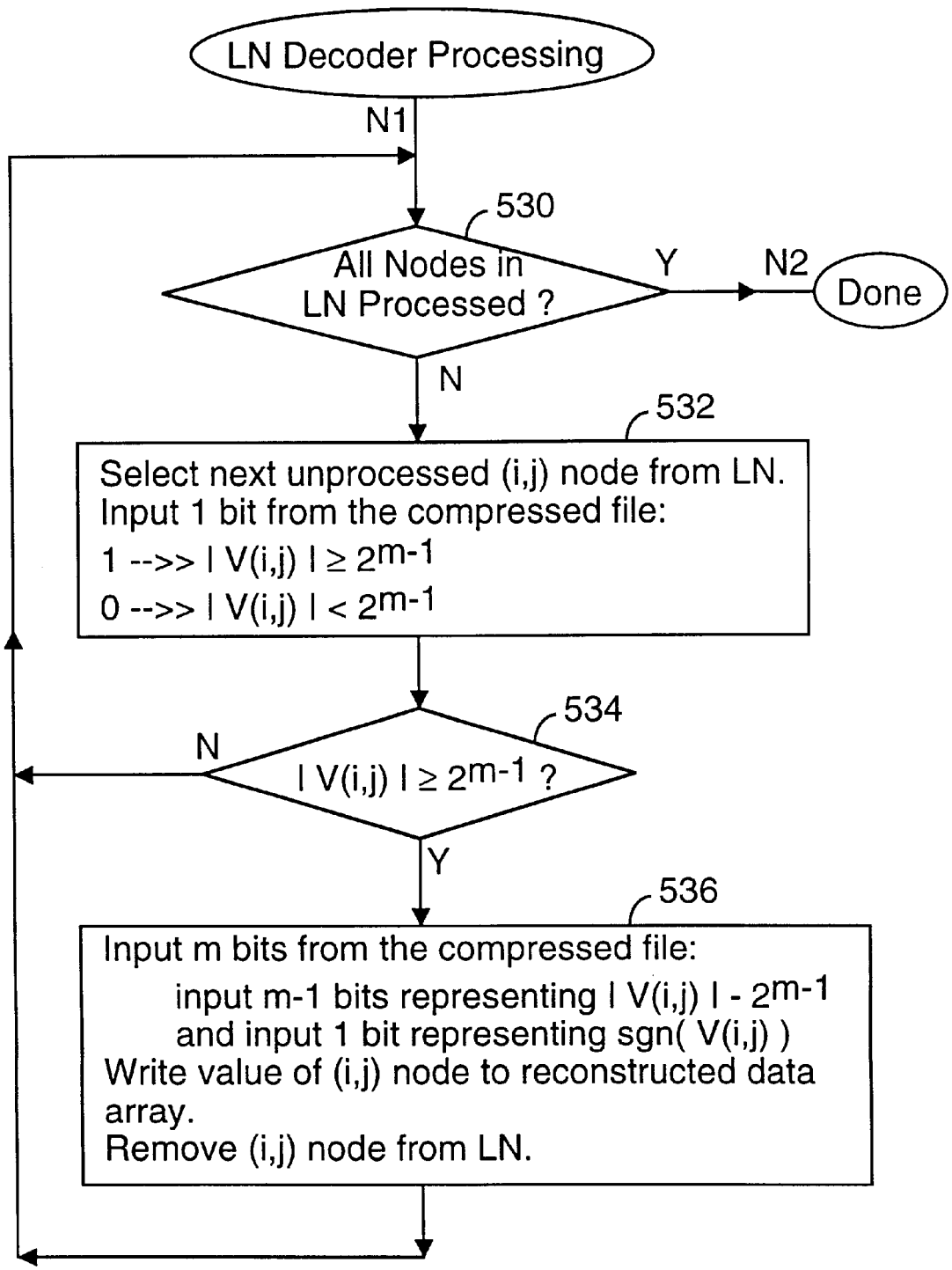

Referring to FIG. 12, the LN decoder processing procedure begins by determining if there are any unprocessed nodes in the list of nodes (step 530). Each time the LN processing procedure is called, the pointer 351 to the next unprocessed node is reset to the very first item in the list. Therefore, unless the list is empty, step 390 will detect the presence of unprocessed nodes in the list when the LN processing procedure is first called. At step 532 the next unprocessed node (i,j) in the list of nodes is selected and one bit is input from the compressed data file. The input bit indicates whether or not the absolute value of the selected node, $|V(i,j)|$, is greater than or equal to $2^{m-1}$.

If the absolute value, $|V(i,j)|$, of the selected node (i,j) is less than $2^{m-1}$ (i.e., if the bit value input in step 532 is 0) (step 534), then processing of the selected node is complete for the current iteration of the encoder procedure's processing loop. Otherwise, if the bit value input in step 532 for the current selected node is 1, the procedure inputs m more bits, including m−1 bits that represent a value equal to $|V(i,j)|-2^{m-1}$ and 1 bit equal to sgn( V(i,j) ). The decoded value of the (i,j) node is written to the reconstructed data array 326 (see FIG. 1), and furthermore the current elected node is removed from the list of nodes (step 536).

The LN decoder processing procedure of FIG. 12 continues until all the nodes in the list of nodes have been processed. When the procedure is completed, the nodes previously in the list whose absolute value was greater than or equal to $2^{m-1}$ have been decoded and removed from the list of nodes.

Figure 13:
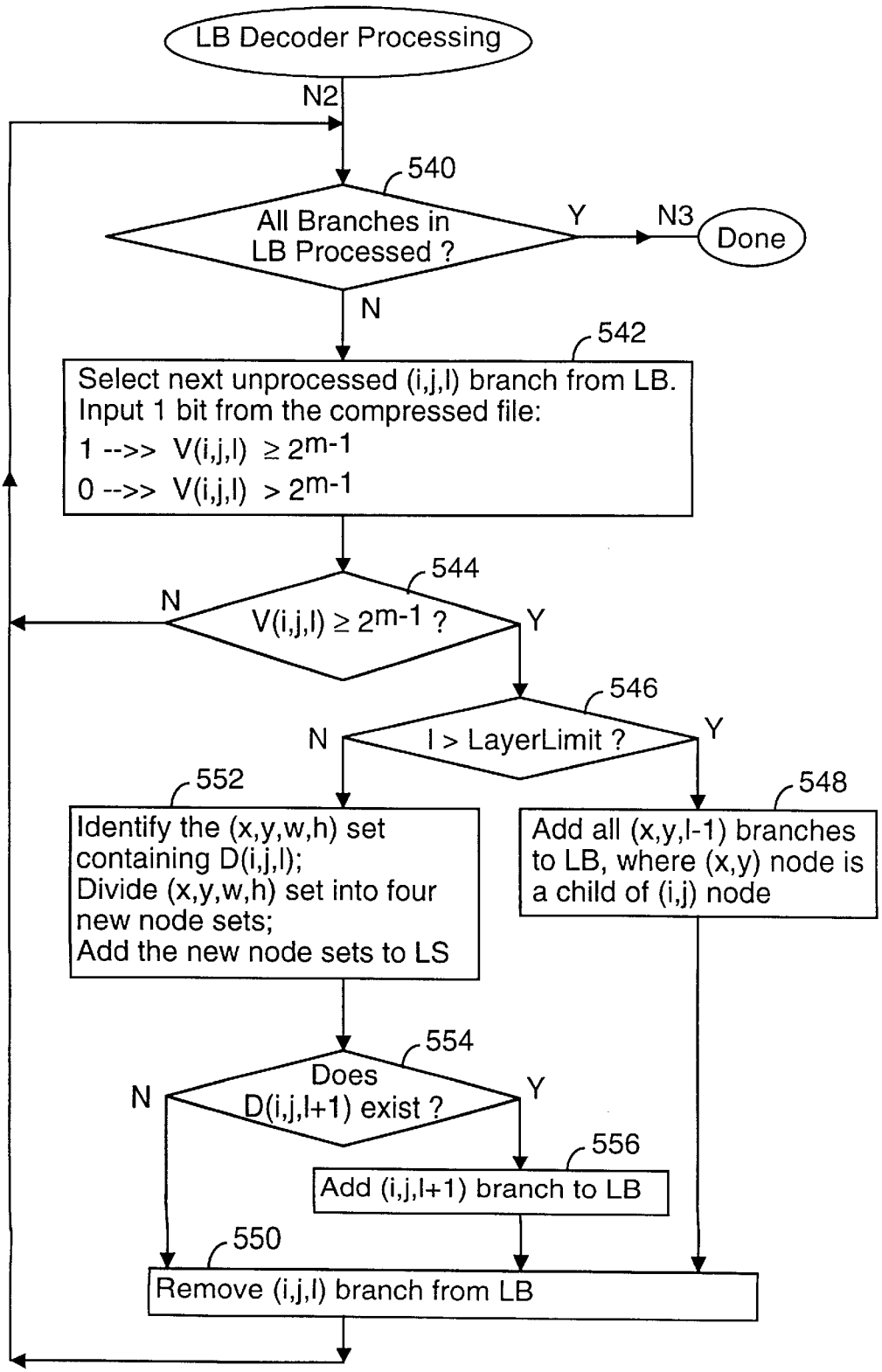

Referring to FIG. 13, the LB decoder processing procedure begins by determining if there are any unprocessed branches in the list of branches (step 540). Each time the LB processing procedure is called, the pointer 352 to the next unprocessed branch is reset to the very first item in the list. Therefore, unless the list is empty, step 540 will detect the presence of unprocessed branches in the list when the LB decoder processing procedure is first called. At step 542 the next unprocessed branch in the list of branches is selected and one bit is input from the compressed file to determine whether or not $V(i,j,l) \geq 2^{m-1}$. If there is at least one node in the (i,j,l) branch whose absolute value is greater than or equal to $2^{m-1}$, a 1 bit is input and otherwise a 0 bit is input.

If the maximum absolute value of the nodes in the selected branch $V(i,j,l)$ is less than $2^{m-1}$ (i.e., if the bit value input in step 542 is 0) (step 544), then processing of the selected branch is complete for the current iteration of the decoder procedure's processing loop. Otherwise, if the bit value input in step 542 for the current selected branch is 1, the selected branch is processed further. In particular, if the branch level I of the selected branch is greater than the LayerLimit, then the selected branch is divided into smaller branches (x,y,l−1), for all (x,y) nodes that are children of the (i,j) node, and those smaller branches are added to the list of branches (step 548). In addition, the selected branch (i,j,l) is removed from the list of branches (step 550). For a two dimensional array of data, four smaller branches will be generated for each branch whose branch depth is greater than the LayerLimit.

If the branch level I of the selected branch is less than or equal to the LayerLimit (step 546), then the procedure identifies the (x,y,w,h) set of nodes containing the node descendants D(i,j,l) at the top level of the selected branch. This set of nodes is divided into $2^N$ new node sets, where N is the number of dimensions associated with the data array being reconstructed (e.g., four new node sets are generated for a two dimensional data array), which are added to the list of sets (step 552). Next, if the data being decoded includes a lower set of descendants D(i,j,l−1) within the selected branch (step 554), a new (i,j,l+1) branch is added to the list of branches (556). in either case, the selected branch (i,j,l) is removed from the list of branches (step 550).

The LB decoder processing procedure of FIG. 13 continues until all the branches in the list of branches have been processed. When the procedure is completed, the branches previously in the list that included at least one node whose absolute value was greater than or equal to $2^{m-1}$ have been divided into either sets of data or smaller branches and removed from the list of branches.

Figure 14:
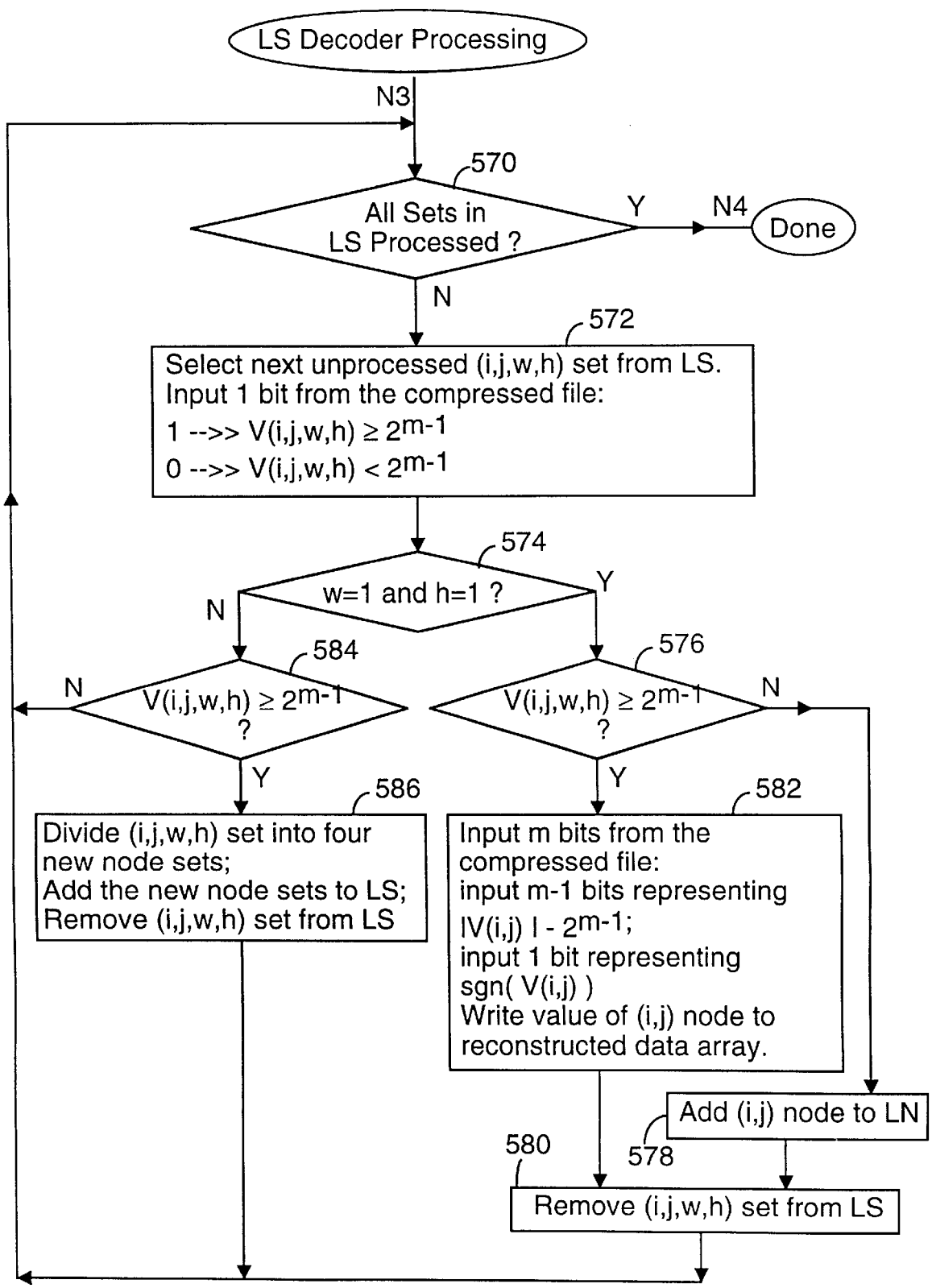

Referring to FIG. 14, the LS decoder processing procedure begins by determining if there are any unprocessed sets in the list of sets (step 570). Each time the LS processing procedure is called, the pointer 353 to the next unprocessed set is reset to the very first item in the list. Therefore, unless the list is empty, step 570 will detect the presence of unprocessed sets in the list when the LS processing procedure is first called. At step 572 the next unprocessed set in the list of sets is selected and one bit is input from the compressed file to determine whether or not $V(i,j,w,h) \geq 2^{m-1}$. Thus, if there is at least one node in the (i,j,w,h) set of nodes whose absolute value is greater than or equal to $2^{m-1}$, a 1 bit is input and otherwise a 0 bit is input.

If the number of nodes in the selected set is equal to 1 (step 574) and the absolute value of the only nodes in the selected set $|V(i,j)|$ is less than $2^{m-1}$ (i.e., if the bit value input by step 572 is 0) (step 576), then the only node (i,j) in the selected set is added to the list of nodes (step 578) and the selected set is removed from the list of sets (step 580). Otherwise, if the number of nodes in the selected set is equal to 1 (step 574) and the bit value input by step 572 is 1 (step 576), then the procedure inputs m bits, including m−1 bits that represent the value of $|V(i,j)|-2^{m-1}$ and 1 bit the is equal to sgn( V(i,j)). The decoded value of the (i,j) node is written to the reconstructed data array (step 582), and furthermore the current selected set (i,j,w,h) is removed from the list of sets (step 580).

However, if the number of nodes in the selected set is greater than 1 (step 574) and the maximum absolute value of the nodes in the selected set V(i,j,w,h) is less than $2^{m-1}$ (i.e., if the bit value input by step 572 is 0) (step 584), then processing of the selected set is complete for the current iteration of the encoder procedure's processing loop. Alternately, if the number of nodes in the selected set is greater than 1 (step 574) and the bit value input by step 572 is 1 (step 584), then the selected set is divided into $2^N$ smaller sets (e.g., four smaller sets for a two dimensional array) and the smaller sets are added to the list of sets. In addition, the selected set (i,j,w,h) is removed from the list of sets (step 586).

The LS decoder processing procedure of FIG. 14 continues until all the sets in the list of sets have been processed. When the procedure is completed, the sets previously in the list that included at least one node whose absolute value was greater than or equal to $2^{m-1}$ have been either divided into smaller sets of data or encoded. These sets have also been removed from the list of sets.

If the correlation between successive wavelet transforms (i.e., between each coefficient (i,j) and its descendants D(i, j,x) in successive layers of the transformed image as shown in FIG. 2) is large, it is preferable to use a small LayerLimit value, such as 0 or 1 to achieve maximum encoding efficiency. However, if the layer to layer correlation is small, it is preferred to use a large LayerLimit value, such as 2 or more, to achieve maximum encoding efficiency.

ALTERNATE EMBODIMENTS

While the description of the invention above has generally indicated that a system using the invention would have both an encoder and decoder, it is anticipated that in many commerical embodiments only a small number of users or machines would include both an encoder and decoder, while large numbers of user or machines would include only a decoder. For instance, decoders in accordance with the present invention might be included in a library of image viewer procedures distributed to users of various World Wide Web browsers, while only users interested in sending or distributing images to other persons might license the use of the encoder.

The present invention is equally applicable to the encoding and decoding of three-dimensional data arrays, and in fact is applicable to the encoding and decoding of N-dimensional data arrays where N is an integer greater than 0.

With respect to steps 392, 396, 402, 432 and 442 (of FIGS. 7 and 9) for outputting node values, it would be possible to use alternate methods for outputting these node values, including encoding each node value using entropy coding, such as Huffman or arithmetic coding.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of encoding a specified data array, comprising the steps of:

in the data array, establishing a set of tree branches, each tree branch representing a distinct subset of nodes in the data array;

for successively smaller values of m, where m is a positive integer assigned an initial value in accordance with a largest absolute node value in the data array, repeatedly performing the steps of:

traversing the set of tree branches, and within each tree branch identifying nodes of the data array whose absolute value is greater than or equal to $2^{m-1}$;

when one of the tree branches contains at least one node having a value greater than or equal to 2m−1, dividing that one tree branch into a plurality of groups of nodes, each group of nodes containing fewer nodes than the one tree branch; and storing bit plane data, organized in accordance with an order associated with the set of tree branches, representing node values for nodes whose absolute value is greater than or equal to $2^{m-1}$ and modifications to the set of tree branches associated with the dividing of branches into smaller branches.

2. The method of claim 1, storing, in a branch list data structure, a list of all the tree branches in the set of tree branches; and establishing a LayerLimit value;

each tree branch having an associated root node and a branch depth value indicating how many node layers intervene between the branch's root node and the nodes of the tree branch closest to the root node;

the branch dividing step including, selecting the branch to be divided, removing the selected branch from the branch list data structure, if the branch depth value of the selected branch is greater than the LayerLimit value, dividing the selected branch into smaller branches having respective root nodes that are children of the branch's root node and each having a branch depth value that is one less than the branch depth value of the selected branch; and if the branch depth value of the selected branch is not greater than the LayerLimit value, dividing the branch into (A) a set of nodes in the selected branch that are closest to the selected branch's root node, and (B) if the selected branch has any other nodes, a branch having a branch depth value that is one more than the branch depth value of the selected branch.

3. The method of claim 1, further including:

providing three list data structures, including a node list data structure for storing a list of nodes in the data array to be processed, a branch list data structure for storing a list of tree branches in the data array to be processed, and a set list data structure for storing a list of data sets;

initially storing in the node list data structure, in a predefined order, node identifiers representing a predefined set of nodes in the specified data array corresponding to coefficients generated by a last iteration of a data decomposition procedure;

initially storing in the branch list data structure, in a predefined order, branch identifiers representing tree branches corresponding to a predefined subset of the nodes initially listed in the node list data structure; each tree branch having an associated root node and a branch depth value indicating how many node layers intervene between the root node and the nodes of the tree branch closest to the root node;

initially storing in the set list data structure no set identifiers; and establishing a LayerLimit value;

the branch dividing step including, selecting the branch to be divided, removing the selected branch from the branch list data structure, if the branch depth value of the selected branch is greater than the LayerLimit value, dividing the selected branch into smaller branches having respective root nodes that are children of the branch's root node and each having a branch depth value that is one less than the branch depth value of the selected branch; and if the branch depth value of the selected branch is not greater than the LayerLimit value, identifying a set of nodes in the selected branch that are closest to the selected branch's root node, storing in the set list data structure a plurality of set identifiers corresponding to a like plurality of smaller sets of nodes that together represent all nodes in the identified set of nodes, and if the selected branch contains any nodes further from its root node than the nodes in the identified set of nodes, adding to the branch list data structure a branch identifier corresponding to a branch with the same root node as the selected branch and a branch depth value that is one more than the branch depth value of the selected branch.

4. The method of claim 3, the step of storing bit plane data including, storing bit plane data in an order associated with the node identifiers stored in the node list data structure, the branch identifiers stored in the branch list data structure and the set identifiers in the set list data structure, the bit plane data representing node values for nodes whose absolute value is greater than or equal to $2^{m-1}$ and modifications to the set of identifiers stored in the node, branch and set list data structures.

5. A computer program product for use in conjunction with a computer system, the computer program product comprising a computer readable storage medium and a computer program mechanism embedded therein, the computer program mechanism comprising:

an data array encoding module, for encoding a specified data array, the module including instructions for:

establishing a set of tree branches in the specified data array, each tree branch representing a distinct subset of nodes in the data array;

for successively smaller values of m, where m is a positive integer assigned an initial value in accordance with a largest absolute node value in the data array, repeatedly performing the steps of:

traversing the set of tree branches, and within each tree branch identifying nodes of the data array whose absolute value is greater than or equal to $2^{m-1}$;

when one of the tree branches contains at least one node having a value greater than or equal to 2m−1, dividing that one tree branch into a plurality of groups of nodes, each group of nodes containing fewer nodes than the one tree branch; and storing bit plane data, organized in accordance with an order associated with the set of tree branches, representing node values for nodes whose absolute value is greater than or equal to $2^{m-1}$ and modifications to the set of tree branches associated with the dividing of branches into smaller branches.

6. The computer program product of claim 5, the data array encoding module further including instructions for:

storing, in a branch list data structure, a list of all the tree branches in the set of tree branches; and establishing a LayerLimit value;

each tree branch having an associated root node and a branch depth value indicating how many node layers intervene between the branch's root node and the nodes of the tree branch closest to the root node;

the branch dividing step including, selecting the branch to be divided, removing the selected branch from the branch list data structure, if the branch depth value of the selected branch is greater than the LayerLimit value, dividing the selected branch into smaller branches having respective root nodes that are children of the branch's root node and each having a branch depth value that is one less than the branch depth value of the selected branch; and if the branch depth value of the selected branch is not greater than the LayerLimit value, dividing the branch into (A) a set of nodes in the selected branch that are closest to the selected branch's root node, and (B) if the selected branch has any other nodes, a branch having a branch depth value that is one more than the branch depth value of the selected branch.

7. The computer program product of claim 5, the data array encoding module further including instructions for:

providing three list data structures, including a node list data structure for storing a list of nodes in the data array to be processed, a branch list data structure for storing a list of tree branches in the data array to be processed, and a set list data structure for storing a list of data sets;

initially storing in the node list data structure, in a predefined order, node identifiers representing a predefined set of nodes in the specified data array corresponding to coefficients generated by a last iteration of a data decomposition procedure;

initially storing in the branch list data structure, in a predefined order, branch identifiers representing tree branches corresponding to a predefined subset of the nodes initially listed in the node list data structure; each tree branch having an associated root node and a branch depth value indicating how many node layers intervene between the root node and the nodes of the tree branch closest to the root node;

initially storing in the set list data structure no set identifiers; and establishing a LayerLimit value;

the branch dividing step including, selecting the branch to be divided, removing the selected branch from the branch list data structure, if the branch depth value of the selected branch is greater than the LayerLimit value, dividing the selected branch into smaller branches having respective root nodes that are children of the branch's root node and each having a branch depth value that is one less than the branch depth value of the selected branch; and if the branch depth value of the selected branch is not greater than the LayerLimit value, identifying a set of nodes in the selected branch that are closest to the selected branch's root node, storing in the set list data structure a plurality of set identifiers corresponding to a like plurality of smaller sets of nodes that together represent all nodes in the identified set of nodes, and if the selected branch contains any nodes further from its root node than the nodes in the identified set of nodes, adding to the branch list data structure a branch identifier corresponding to a branch with the same root node as the selected branch and a branch depth value that is one more than the branch depth value of the selected branch.

8. The computer program product of claim 7, wherein the instructions in the data array encoding module for storing bit plane data include instructions for storing bit plane data in an order associated with the node identifiers stored in the node list data structure, the branch identifiers stored in the branch list data structure and the set identifiers in the set list data structure, the bit plane data representing node values for nodes whose absolute value is greater than or equal to $2^{m-1}$ and modifications to the set of identifiers stored in the node, branch and set list data structures.

9. A computer data signal embodied in a carrier wave, comprising:

a data array encoding module, for encoding a specified data array, the module including instructions for:

establishing a set of tree branches in the specified data array, each tree branch representing a distinct subset of nodes in the data array;

for successively smaller values of m, where m is a positive integer assigned an initial value in accordance with a largest absolute node value in the data array, repeatedly performing the steps of:

traversing the set of tree branches, and within each tree branch identifying nodes of the data array whose absolute value is greater than or equal to $2^{m-1}$;

when one of the tree branches contains at least one node having a value greater than or equal to $2^{m-1}$, dividing that one tree branch into a plurality of groups of nodes, each group of nodes containing fewer nodes than the one tree branch; and storing bit plane data, organized in accordance with an order associated with the set of tree branches, representing node values for nodes whose absolute value is greater than or equal to $2^{m-1}$ and modifications to the set of tree branches associated with the dividing of branches into smaller branches.

10. The computer data signal of claim 9, the data array encoding module further including instructions for:

storing, in a branch list data structure, a list of all the tree branches in the set of tree branches; and establishing a LayerLimit value;

each tree branch having an associated root node and a branch depth value indicating how many node layers intervene between the branch's root node and the nodes of the tree branch closest to the root node;

the branch dividing step including, selecting the branch to be divided, removing the selected branch from the branch list data structure, if the branch depth value of the selected branch is greater than the LayerLimit value, dividing the selected branch into smaller branches having respective root nodes that are children of the branch's root node and each having a branch depth value that is one less than the branch depth value of the selected branch; and if the branch depth value of the selected branch is not greater than the LayerLimit value, dividing the branch into (A) a set of nodes in the selected branch that are closest to the selected branch's root node, and (B) if the selected branch has any other nodes, a branch having a branch depth value that is one more than the branch depth value of the selected branch.

11. A computer program product for use in conjunction with a computer system, the computer program product comprising a computer readable storage medium and a computer program mechanism embedded therein, the computer program mechanism comprising:

an data array encoding module, for encoding a specified data array, the module including instructions for:

establishing three list data structures, including a node list data structure for storing a list of nodes in the data array to be processed, a branch list data structure for storing a list of tree branches in the data array to be processed and a set list data structure for storing a list of data sets;

initially storing in said node list data structure, in a predefined order, node identifiers representing a predefined set of nodes in said specified data array corresponding to coefficients generated by a last iteration of a data decomposition procedure;

initially storing in the branch list data structure, in a predefined order, branch identifiers representing tree branches corresponding to a predefined subset of the nodes initially listed in said node list data structure; each tree branch having an associated root node and a branch depth value indicating how many node layers intervene between said root node and the nodes of said tree branch closest to said root node;

initially storing in the set list data structure no set identifiers;

establishing a LayerLimit value;

for successively smaller values of m, where m is a positive integer assigned an initial value in accordance with a largest absolute node value in said data array, repeatedly performing the steps of:

sequentially selecting each node listed in said node list data structure and generating an output value for each selected node, said output value comprising a predefined null value when said node's value is less than 2m−1 and otherwise comprising a set of bits representing said node's value, and removing from said node list data structure the node identifiers corresponding to each node having a value greater than or equal to 2m−1;

sequentially selecting each branch listed in said branch list data structure, generating an output value for each selected branch, said output value indicating whether or not said selected branch contains at least one node having a value greater than or equal to 2m−1, when said selected branch contains at least one node having a value greater than or equal to 2m−1:

removing said selected branch from said branch list data structure, if the branch depth value of said selected branch is greater than said LayerLimit value, dividing said selected branch into smaller branches having respective root nodes that are children of said selected branch's root node and each having a branch depth value that is one less than the branch depth value of said selected branch; and if the branch depth value of said selected branch is not greater than said LayerLimit value, identifying a set of nodes in said selected branch that are closest to said selected branch's root node, storing in said set list data structure a plurality of set identifiers corresponding to a like plurality of smaller sets of nodes that together represent all nodes in said identified set of nodes, and if said selected branch contains any nodes further from its root node than said nodes in said identified set of nodes, adding to said branch list data structure a branch identifier corresponding to a branch with the same root node as said selected branch and a branch depth value that is one more than the branch depth value of said selected branch;

sequentially selecting each set listed in said set list data structure, generating an output value for each selected set, said output value indicating whether or not said selected set contains at least one node having a value greater than or equal to 2m−1, when said selected set has a number of nodes equal to a predefined minimum set size and at least one node in said selected set has a value greater than or equal to 2m−1, generating one or more output values representing the value of each node in said selected set and removing said selected set from said set list data structure; and when said selected set has more nodes than said predefined minimum set size, and at least one node in said selected set has a value greater than or equal to 2m−1, storing in said set list data structure a plurality of set identifiers corresponding to a number of smaller sets that together represent all nodes in said selected set of nodes and removing said selected set from said set list data structure.

12. A computer program product for use in conjunction with a computer system, the computer program product comprising a computer readable storage medium and a computer program mechanism embedded therein, the computer program mechanism comprising:

an data array encoding module, for encoding a specified data array, the module including instructions for:

establishing three list data structures, including a node list data structure for storing a list of nodes in the data array to be processed, a branch list data structure for storing a list of tree branches in the data array to be processed and a set list data structure for storing a list of data sets;

initially storing in said node list data structure, in a predefined order, node identifiers representing a predefined set of nodes in said specified data array corresponding to coefficients generated by a last iteration of a data decomposition procedure;

initially storing in the branch list data structure, in a predefined order, branch identifiers representing tree branches corresponding to a predefined subset of the nodes initially listed in said node list data structure; each tree branch having an associated root node and a branch depth value indicating how many node layers intervene between said root node and the nodes of said tree branch closest to said root node;

initially storing in the set list data structure no set identifiers;

establishing a LayerLimit value;

for successively smaller values of m, where m is a positive integer assigned an initial value in accordance with a largest absolute node value in said data array, considering each node, branch and set listed in said node, branch and set list data structures and outputting data to a compressed data output file by repeatedly performing the steps of:

for the current value of m, outputting node value magnitude data indicating for each node identified in said node list data structure, each branch identified in said branch list data structure and each set in said set list data structure, said data output indicating whether said node's absolute value, said branches node of greatest absolute value, and said set's node of greatest absolute value is greater than or equal to $2m-1$;

when said node value magnitude data for a respective considered node, branch or set indicates a value greater than or equal to $2m-1$:

removing the respective considered node, branch or set from the respective node, branch or set list data structure, for each such branch, if the branch depth value of said considered branch is greater than said LayerLimit value, dividing said considered branch into smaller branches having respective root nodes that are children of said considered branch's root node and each having a branch depth value that is one less than the branch depth value of said considered branch, and otherwise identifying a set of nodes in said considered branch that are closest to said considered branch's root node, storing in said set list data structure a plurality of set identifiers corresponding to a like plurality of smaller sets of nodes that together represent all nodes in said identified set of nodes, and if said considered branch contains any nodes further from its root node than said nodes in said identified set of nodes, adding to said branch list data structure a branch identifier corresponding to a branch with the same root node as said considered branch and a branch depth value that is one more than the branch depth value of said considered branch; and for each such respective set, when said set has more than a predefined minimum number of nodes, storing in said set list data structure a plurality of set identifiers corresponding to a number of smaller sets that together represent all nodes in said selected set of nodes, and otherwise generating one or more output values representing the value of each node in said selected set.

13. A computer program product for use in conjunction with a computer system, the computer program product comprising a computer readable storage medium and a computer program mechanism embedded therein, the computer program mechanism comprising:

an data array encoding module, for encoding a specified data array, the module including instructions for:

establishing three list data structures, including a node list data structure for storing a list of nodes in the specified data array, a branch list data structure for storing a list of tree branches in the data array to be processed and a set list data structure for storing a list of data sets;

initially storing in said node list data structure, in a predefined order, node identifiers representing a predefined set of nodes in said specified data array corresponding to coefficients generated by a last iteration of a data decomposition procedure;

initially storing in the branch list data structure, in a predefined order, branch identifiers representing tree branches corresponding to a predefined subset of the nodes initially listed in said node list data structure; each tree branch having an associated root node and a branch depth value indicating how many node layers intervene between said root node and the nodes of said tree branch closest to said root node;

initially storing in the set list data structure no set identifiers;

inputting a LayerLimit value from the encoded data and an initial value of m;

for successively smaller values of m, where m is a positive integer, repeatedly performing the steps of:

(A) successively reading data bits of the encoded data, said read data bits representing information about said nodes represented by said node identifiers in said node list data structure, said branches represented by said branch identifiers in said branch list data structure and said sets represented by said set identifiers in said set list data structure;

(B) processing the subset of read data bits representing information about each identified node listed in said node list data structure to determine whether said identified node's value is greater than or equal to $2m-1$, and when said determination is positive, interpreting the subset of read data bits to reconstruct said identified node's value and outputting said reconstructed data value to said reconstructed data array at a position corresponding to said identified node;

(C) processing the subset of read data bits representing information about each identified branch listed in said branch list data structure to determine whether said identified branch contains at least one node having a value greater than or equal to $2m-1$;

when said determination is positive:

removing said selected branch from said branch list data structure;

if the branch depth value of said identified branch is greater than said LayerLimit value, dividing said identified branch into smaller branches having respective root nodes that are children of said identified branch's root node and each having a branch depth value that is one less than the branch depth value of said identified branch; and if the branch depth value of said identified branch is not greater than said LayerLimit value, identifying a set of nodes in said identified branch that are closest to said identified branch's root node, storing in said set list data structure a plurality of set identifiers corresponding to a like plurality of smaller sets of nodes that together represent all nodes in said identified set of nodes, and if said identified branch contains any nodes further from its root node than said nodes in said identified set of nodes, adding to said branch list data structure a branch identifier corresponding to a branch with the same root node as said identified branch and a branch depth value that is one more than the branch depth value of said identified branch; and (D) processing the subset of read data bits representing information about each identified set listed in said set list data structure to determine whether said identified set contains at least one node having a value greater than or equal to 2m−1;

when said determination is positive and said identified set has no more nodes than a predefined minimum set size, interpreting the subset of read data bits to reconstruct the value of each node in said identified set and outputting each said reconstructed node value to said reconstructed data array at a respective reconstructed data array position;

when said determination is positive and said identified set has more nodes than said predefined minimum set size, storing in said set list data structure a plurality of set identifiers corresponding to a number of smaller sets that together represent all nodes in said identified set of nodes and removing said identified set from said set list data structure.

* * * * *